United States Patent Office 2,860,135
Patented Nov. 11, 1958

2,860,135

PREPARATION OF ARYLSULPHONYL THIAZOLES

Ralph H. Beutel, Newark, and Robert B. Currie, Roselle, N. J., assignors to Merck & Co., Inc., Rahway, N. J., a corporation of New Jersey No Drawing. Application January 7, 1957
Serial No. 632,649

3 Claims. (Cl. 260—239.95)

This invention relates to the preparation of arylsulfonyl thiazoles, and more particularly to the process for preparing arylsulfonyl thiazoles, such as acetylsulfathiazole, by the condensation of a 2,5-dihydroxy-1,4-dithiane with metal salts of corresponding arylsulfonyl cyanamides.

In accordance with the present invention, a metal salt of an arylsulfonyl cyanamide, which has the structural formula

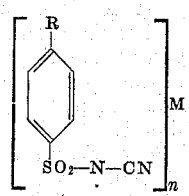

wherein R is acylamino, acylated alkylamino, arylamino, aralkylamino, nitro and other groups which may be converted to the amino group, M is an alkali metal, or alkaline earth metal, and $n$ is a number which has the value of one when M is a monovalent radical and a value of two when M is a divalent radical, is condensed with the cis or trans form or a mixture of the cis and trans forms of 2,5-dihydroxy-1,4-dithiane or 2,5-dihydroxy-3,6-disubstituted-1,4-dithianes which may be identified by the following formula

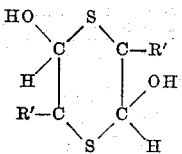

wherein R' is hydrogen, lower alkyl, aryl, or aralkyl.

We have found that these two compounds, i. e., the arylsulfonyl cyanamide and 2,5-dihydroxy-1,4-dithiane or 2,5-dihydroxy-3,6-disubstituted-1,4-dithiane may be condensed in the presence of water or any lower aliphatic alcohol such as methanol or ethanol to yield an arylsulfonylthiazole, having the structural formula

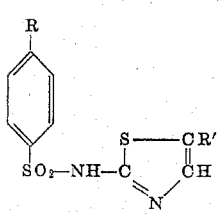

wherein R and R' are as above.

Sulfathiazole may then be conveniently produced by hydrolysis or reduction of the arylsulfonylthiazole as indicated by the following reaction

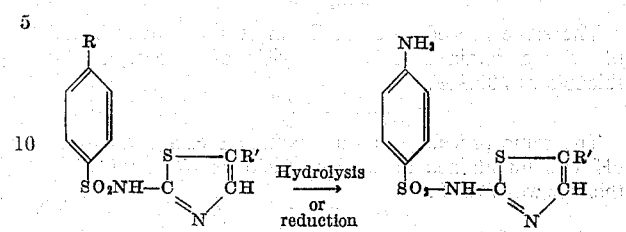

wherein R and R' are as above.

Sulfathiazole, and its derivatives, which are useful antibacterial and therapeutic agents, can consequently be economically made on a commercial scale with optimum yields in accordance with the process of the present invention.

The starting material, arylsulfonyl cyanamide, may be produced by known methods such as the reaction of calcium cyanamide with acetylsulfanilyl chloride to produce calcium acetylsulfanilyl cyanamide (Leitch et al., Canadian J. Res. 23B, 139–57, 1945).

The other starting material, 2,5-dihydroxy-1,4-dithiane, may be provided by any known synthesis such as the synthesis from a hydrosulfide and an α-chloroaldehyde such as α-cholorpropionaldehyde, or chloroacetaldehyde, as for example the preparation of 2,5-dihydroxy-1,4-dithiane from sodium hydrosulfide and chloroacetaldehyde (Monatsh. 55, 1088–96, 1954).

Specifically, in accordance with the present invention, calcium acetylsulfanilylcyanamide is reacted with 2,5-dihydroxy-1,4-dithiane in an aqueous medium. While the reaction is preferably conducted at temperatures in the range from about 50° C. to reflux temperatures, the preferred temperature for optimum yields is 70° C. to 90° C. The pH of the reaction medium may range between the limits of 0.1 and 4, as there is little or no reaction at pH values above 4, but it is preferred that a pH of 2 to 3 be maintained for optimum performance. Any suitable acid rendering a pH within the range of 0.1 and 4 may be employed, such as hydrochloric, sulfuric, acetic, maleic and phosphoric acids. The rate of reaction will vary with the temperature and the pH of the reaction medium. When the reaction is complete, the mixture is cooled to about room temperature and the precipitated N⁴-acetylsulfathiazole is recovered. The acetylsulfathiazole may then be conveniently converted into sulfathiazole by hydrolysis.

In order that the invention may be more fully understood, the following examples are set forth for the purpose of illustration and the enumeration of details is not to be construed as limiting the scope of the invention. All parts used are parts by weight unless otherwise expressly stated.

Example 1

PREPARATION OF N⁴-ACETYLSULFATHIAZOLE

To 800 milliliters of water preheated to 90° C. 258 grams (0.5 mole) of calcium acetylsulfanilylcyanamide was added together with 83.6 grams (0.55 mole) of 2,5-dihydroxy-1,4-dithiane. The pH was immediately adjusted to pH 2–3 by addition of 38% hydrochloric acid. The pH was maintained at 2–3 for two hours by adding hydrochloric acid as required (a total of about 85 milliliters) holding the temperature at 80° C. At the end of the two hour period the mixture was cooled at 25° C. and filtered. The precipitated N⁴-acetylsulfathiazole was washed with water.

The yield of $N^4$-acetylsulfathiazole was 282 grams, or 95% of the theoretical based on calcium acetylsulfanilyl cyanamide. The crude product melts at 245–250° C.

Example 2

The same procedure as in Example 1 except that the pH was maintained at 1. The yield of $N^4$-acetylsulfathiazole was 89.0%.

Example 3

The same procedure as in Example 1 except that the pH was maintained at 3. The yield of $N^4$-acetylsulfathiazole was 89.9%.

Example 4

The same procedure as in Example 1 except that the pH was maintained at 4. The yield of $N^4$-acetylsulfathiazole was 71.5%.

Example 5

The same procedure as in Example 1 except that maleic acid was the acid used and it was added all at once. The yield of $N^4$-acetylsulfathiazole was 82.1%.

Example 6

The same procedure as in Example 1 except that sodium acetylsulfanilylcyanamide was the cyanamide used and the acid used was phosphoric acid, said acid being added all at once. The yield of $N^4$-acetylsulfathiazole was 98.2%.

Example 7

The same procedure as in Example 1 except that acetic acid was the acid used and it was added all at once. The yield of $N^4$-acetylsulfathiazole was 49.5%.

Example 8

The same procedure as in Example 1 except that the temperature of the reaction was maintained at 100° C. The yield of $N^4$-acetylsulfathiazole was 78.5%.

Example 9

The same procedure as in Example 1 except that the temperature of the reaction was maintained at 75° C. The yield of $N^4$-acetylsulfathiazole was 85.8%.

Example 10

A mixture of 51.6 grams of calcium acetylsulfanilyl cyanamide and 16.72 grams of 2,5-dihydroxy-1,4-dithiane in 250 milliliters of absolute ethanol is heated to reflux temperature and 12 milliliters of concentrated hydrochloric acid was added at a constant rate over 15 minutes. Over the next one and one half hours, an additional 3.5 milliliters of acid was added. The pH of the mixture as taken with a glass electrode ranged between 0.8 and 1.8. The reaction mixture was cooled to 25° C. $N^4$-acetylsulfathiazole precipitate removed by filtration and dried had a melting point of 253–257° C.

Example 11

PREPARATION OF SULFATHIAZOLE

To an aqueous solution of $N^4$-acetylsulfathiazole obtained by any of the procedures of Examples 1 to 10 was added sodium hydroxide and the ingredients were refluxed. The solution was cooled and sodium sulfathiazole crystallized from solution. The sodium sulfathiazole was dissolved in water and treated with concentrated hydrochloric acid. When solution was complete the pH of the filtrate was adjusted to pH 6.5 by adding concentrated ammonia. After the sulfathiazole had precipitated, it was filtered and washed with water. There was obtained sulfathiazole melting at 201°–203° C. A mixed melting point with an authentic sample of sulfathiazole gave no depression.

The above examples and description are illustrative only and may be changed and modified without departing from the principles and scope of the present invention.

We claim:

1. The process which comprises reacting a compound selected from the group consisting of acetyl-sulfanilyl cyanamide and alkali metal and alkaline earth metal salts thereof with 2,5-dihydroxy-1,4-dithiane, maintaining the pH of the reaction mixture between 0.1 and 4 and the temperature between 50° C. and reflux temperature to form $N^4$-acetylsulfathiazole.

2. The process which comprises reacting calcium acetylsulfanilyl cyanamide with 2,5-dihydroxy-1,4-dithiane, maintaining the pH of the reaction mixture between 0.1 and 4 and the temperature between 50° C. and reflux temperature to form $N^4$-acetylsulfathiazole.

3. The process which comprises reacting sodium acetylsulfanilyl cyanamide with 2,5-dihydroxy-1,4-dithiane, maintaining the pH of the reaction mixture between 0.1 and 4 and the temperature between 50° C. and reflux temperature to form $N^4$-acetylsulfathiazole.

References Cited in the file of this patent

UNITED STATES PATENTS

| | | |
|---|---|---|
| 2,358,031 | Roblin et al. | Sept. 12, 1944 |
| 2,366,189 | Hiemenz | Jan. 2, 1945 |
| 2,385,224 | Newbery et al. | Sept. 18, 1945 |